Figure 1:
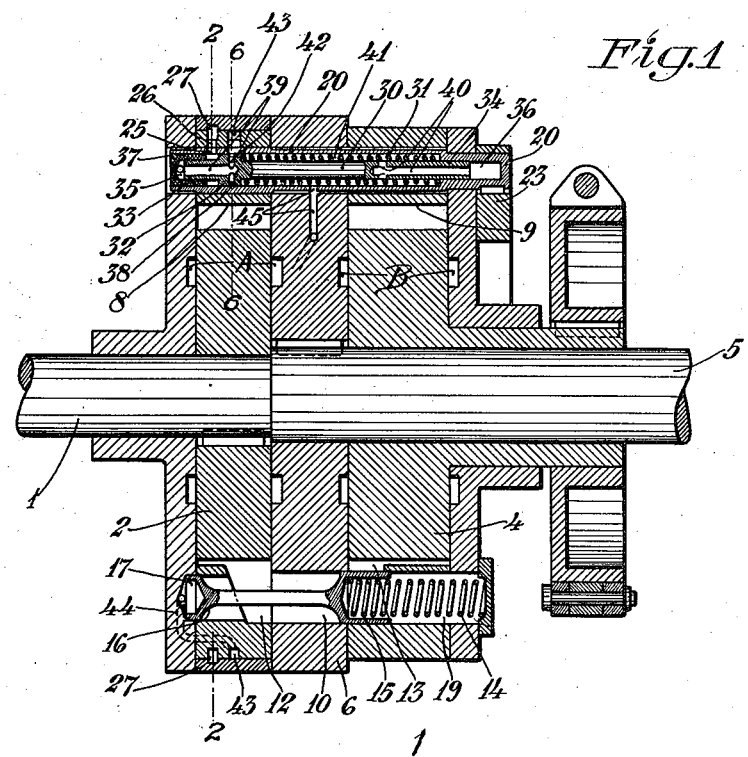

Dec. 14, 1926.

S. G. WINGQUIST

HYDRAULIC COUPLING AND CHANGE SPEED GEAR

Filed July 23, 1924    2 Sheets-Sheet 1

Inventor:
Sven Gustaf Wingquist
By Attorneys
Fraser, Myers & Manley.

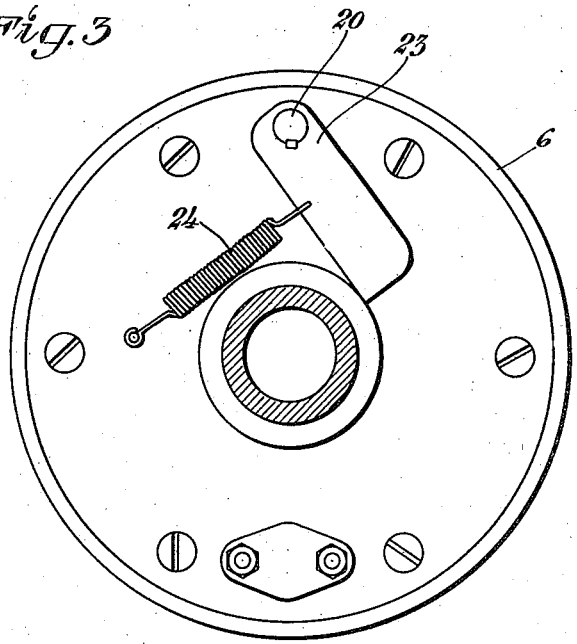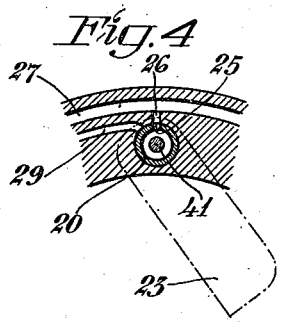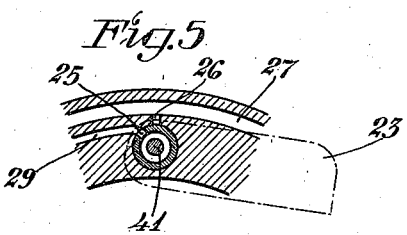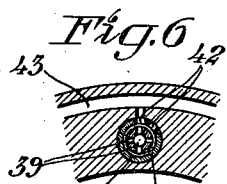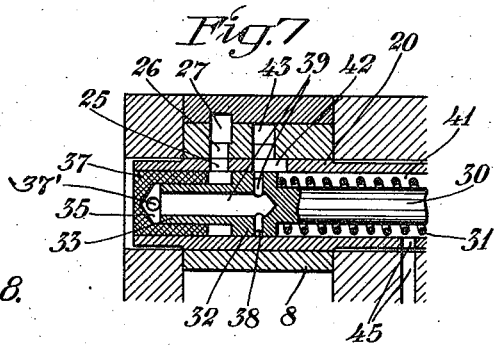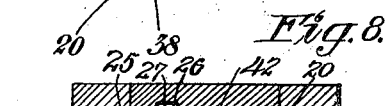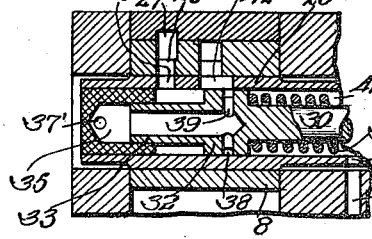

Patented Dec. 14, 1926.

1,610,406

UNITED STATES PATENT OFFICE.

SVEN GUSTAF WINGQUIST, OF GOTTENBORG, SWEDEN.

HYDRAULIC COUPLING AND CHANGE-SPEED GEAR.

Application filed July 23, 1924, Serial No. 727,690, and in Sweden August 29, 1923.

This invention relates to hydraulic coupling and change speed gears comprising one or more pump elements or groups of pump elements and provided with certain valve devices, through the adjustment of which the communication between the pump elements is opened and shut off, respectively, and changes in the transmission ratio thereby effected.

The invention consists, substantially in this, that in combination with the main valve or main valves there is provided one or more auxiliary valves, so devised, as to, through hydraulic control, hold the main valve or main valves closed above a certain determined number of R. P. M. regardless of the fluid pressure and also to hold said main valve or valves closed below said number of R. P. M. if a certain determined pressure be not exceeded, but to hold said main valve or main valves open below said number of revolutions, if the determined pressure be exceeded. The auxiliary valve device is in this case, preferably, also so devised as to, after cutting in a transmission ratio, permit readjustment to the preceding transmission ratio, only after the fluid pressure has obtained a value corresponding to operating conditions which in the said preceding ratio will result in a driving fluid pressure lower than the pressure at which the cutting in of the first mentioned transmission ratio was effected. The auxiliary valve device is preferably constructed as a sleeve, rotatably mounted, parallel to a rotor axis, in one of the rotary parts of the change speed gear and sensitive to centrifugal force. The said valve device is further provided with a port controlling piston actuated by the driving fluid and also suitable channels, the whole assembly being so arranged as to automatically vary the total fluid pressure acting on the main valve or valves whereby to automatically adjust the same to change the transmission ratio of the gear in accordance with the demands of various operating conditions.

The auxiliary valve device, as has been already pointed out, is so devised as to effect, on exceeding a predetermined number of R. P. M. and independent of the value of the fluid pressure, an adjustment of the main valve or main valves to the position in which a lower transmission ratio is obtained. There being only one speed reduction provided in the transmission illustrated, such lower ratio would be direct drive, but in a transmission having several ratios in addition to direct drive the valve control device would shift to the ratio next below the one which at any moment is operative. One object of this arrangement will be readily understood from the fact that there is a limiting high speed beyond which the power of any engine begins to fall off, so that regardless of the load, there could be no benefit in allowing the motor to exceed such speed. In avoiding this excessive speed, much undue wear of the motor and transmission is obviously avoided.

In the annexed drawings only one form of embodiment of a hydraulic coupling and change speed gear according to this invention is shown. Fig. 1 is an axial section of the change speed gear along the line 1—1 of Fig. 2.

Figure 2:
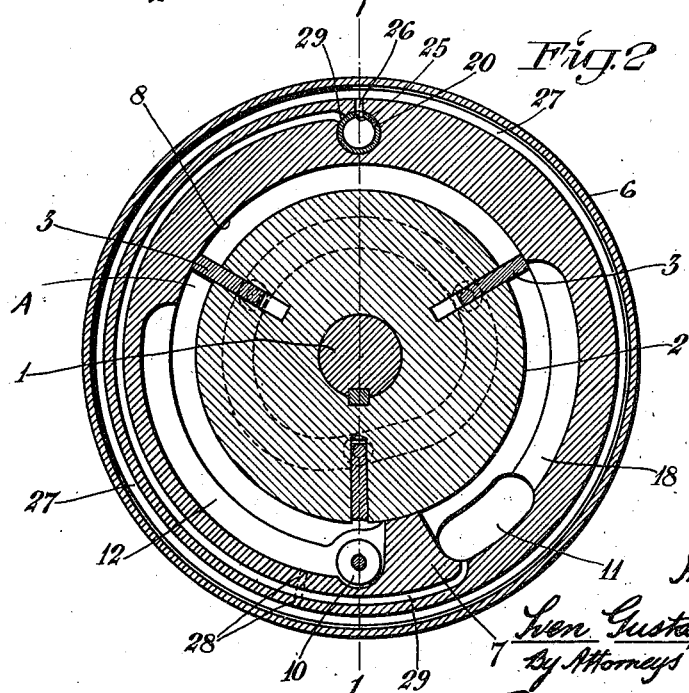

Fig. 2 is a cross-section thereof along the line 2—2 of Fig. 1.

Fig. 3 is an end view of the change speed gear partly in section. Figs. 4 and 5 are sectional views of a detail of the auxiliary valve device in its two limit positions. Fig. 6 is a cross-section of the auxiliary valve device along the line 6—6 of Fig. 1. Fig. 7 is a fragmentary sectional view of part of the auxiliary valve device on an enlarged scale. Fig. 8 is the same view as Fig. 7 but shows the parts in their opposite working relationship.

The form of embodiment of the change speed gear shown in the drawing consists of a driving rotor 2 connected to a driving shaft 1 and provided with radially movable working vanes 3, a releasable stator 4 having, as has the rotor 2, radially movable working vanes, and a driven rotor 6 connected to a driven shaft 5, said rotor being common to the rotor 2 and the stator 4 and provided with abutments and working surfaces respectively, the abutment 7 and the working surface 8 belonging to the rotor 2 being shown in Figs. 1 and 2, whereas only the working surface 9 belonging to the stator 4 is visible in Fig. 1. The two rotors 2, 6 form in this case in known manner a sliding vane pump device and the stator 4 and the rotor 6 a second sliding vane pump device hereinafter referred to respectively as pumps A and B, these pumps acting respectively as delivery and receiving pumps in normal operation, as is well understood in the art. Since it may be argued that each of the vanes in a rotor is capable of pumping independently of the other vanes, we will hereinafter have occasion to refer to the group of pump elements performing a common duty as a pump or pumping stage. Arranged between the two pump devices are a pressure channel 10 and a suction channel 11. In the pressure channel 10 connecting the pressure chambers 12 and 13, respectively, of the two pump devices, there is arranged a piston valve 15 acted on directly by the fluid pressure in one direction and by a spring 14 in the other. The said valve is directly connected to an auxiliary piston 16, the adjacent face of which (with respect to the piston valve 15) is, as is the piston valve, permanently exposed to the pressure of the pressure chamber 12 of the pump device A. The remote face of said auxiliary piston is exposed to the action of fluid in a chamber 17 which may either be brought into communication with the said pressure chamber 12 or the suction chamber 18, respectively, by means of an auxiliary valve more particularly described below, so that the main valve 15 may be caused by fluid pressure either to open or shut off the communication between the pressure chambers 12 and 13 of the two pump devices A and B. The chamber 19 containing the compression spring is in any suitable manner (not shown) permanently connected to a suction or idle fluid chamber of the pumping system. In the present embodiment the piston valve 15 has the same diameter as the auxiliary piston 16, but the valve 15 may, if desired, be constructed with greater or less diameter than the auxiliary piston.

In the form of embodiment of the main valve 15 and its auxiliary piston 16 shown, it is evident that, if the chamber 17 giving the fluid access to the remote face of the auxiliary piston 16 be brought into communication with the suction or idle fluid chamber, the main valve 15 will be closed by the action of spring 14, since the opposed faces of the piston valve 15 and the auxiliary piston 16 are equal and exposed to the same force by which arrangement there is achieved in the valve, a state of neutral equilibrium with respect to fluid pressure. When valve 15 is thus closed communication between the pressure chambers of the pump devices is shut off. If on the other hand chamber 17 be brought into communication with the pressure chamber, the forces acting on the two faces of the auxiliary piston 16 will obviously be neutralized, the piston being exposed on both sides to the same fluid pressure, and the pressure acting on the main valve 15, if sufficient to overcome the tension of the spring 14, opens the communication between the pump devices, so that a change in the transmission ratio is performed.

Since the auxiliary piston 16 is preferably constructed with less diameter than the main valve 15, a spring will evidently be required for closing the valve 15, because its effective pressure surface is greater than that of the auxiliary piston and thus the pressure in the pressure chamber 12, even if the chamber 17 be in communication with the suction chamber, always tends to open the valve 15. If the valve 15 is constructed in this manner, it will serve as a safety valve since, notwithstanding the auxiliary piston 16 may be exposed to a continuing one-sided fluid pressure from the chamber 12, tending to close the valve, it will always be opened at a certain predetermined high pressure depending upon the strength of the spring 14 and the difference in area between the main valve and the auxiliary piston. My copending U. S. application Serial No. 727,689, filed July 23, 1924, discloses two other arrangements of the main valve and auxiliary piston above described. According to one of these the said valve and piston both have the same effective pressure area. In the other arrangement the area of the piston is greater than the area of the valve.

The control of the described main valve is brought about according to the invention by means of an auxiliary valve device more particularly described below.

The auxiliary valve consists of a sleeve 20 rotatably mounted in the rotor 6 and parallel to the axis thereof. It is provided with a weight 23 which is held inwards towards the axis of rotation by means of a spring 24, as long as centrifugal force is not able to overcome the tension of the spring. The spring 24 is to be so dimensioned and arranged with respect to the weight 23 that said weight will always occupy either its extreme outer or inner position. This is achieved by disposing the weight 23 in such manner that as it moves outward from its inner position the increase in centrifugal force due to the increasing radius of gyration of the weight will be greater than the increase of the opposing force due to the corresponding elongation of the spring. By such arrangement it is evident that above a certain number of R. P. M. the sleeve 20 with the weight 23 will occupy the position shown in Fig. 5, but below the same number of R. P. M. the position shown in Fig. 4.

The sleeve is provided with an orifice 25, which, when the weight 23 is turned inwards, through an orifice 26 in the rotor 6 opens into a channel 27, which in turn through an aperture 28 communicates with the pressure chamber 12 of the device. In the other extreme position of the sleeve 20 the orifice 25 opens into a channel 29 communicating with the suction or idle fluid chamber 18 of the device (Figs. 5 and 2).

Thus, it is obvious that below a certain number of R. P. M the pressure will be admitted through the orifice 25 in the sleeve 20 and that above the same number of revolutions a partial vacuum will be admitted.

Axially movable within the sleeve 20 is a piston 30 which is pressed to the left (Figs. 1 and 7) by means of a spring 31. The middle part 32 longitudinally of the piston 30 has a larger diameter than either end portion and makes a fluid tight seal against the walls of the said sleeve, whereas the end portions 33, 34 are located in suitable recesses 35, 36 provided respectively in a bushing member 37 secured by means of a pin 37' within the said sleeve at its left end, and a coaxial bore of reduced diameter at its right end. The thicker part 32 of the piston 30 is provided with an annular recess 38, which communicates to the left through a central bore and ports 39 in the piston with the recess 35. The recess 36 in the right hand end of sleeve 20, communicates through openings 40 in the piston with space 41 between the piston and sleeve 20, so that the fluid may freely pass from one space to the other, when the piston 30 moves axially. The sleeve 20 is further provided with two apertures 42, one or the other of which always opens into a channel 43, which communicates through a channel 44 (Fig. 1) with the control chamber 17 at the left end of the main valve member 15, 16, so that the valve will be opened or closed, respectively, as pressure or partial vacuum is admitted through the channel 44. Further the part of the annular space 41 between the sleeve 20 and piston 30 lying to the right of the enlarged central portion 32 of said piston always communicates with the suction chamber of the device through a channel 45.

The mode of operation is as follows:

According to Figs. 1, 2 and 4 the device is shown as running in direct drive. If, when the parts are in the position shown, the pressure in the pressure chamber 12 rises, it will be transmitted through the channels 28, 27, 26 and the orifice 25 into the portion of the annular space 41 located to the left side of the enlarged piston part 32 and will start to move the piston to the right providing the pressure be sufficiently high to compress spring 31. At the beginning of this movement the chamber 35 communicates with the suction chamber through the apertures and channels 39, 38, 42, 41, 45, as is the case with the chamber 17 to the left of the main valve member through the channels 44, 43, 42, 41, 45. The part 32 of the piston 30 sliding fluid tight within the sleeve 20 has its right hand edge so located that the apertures 42 open into the recess 41 as well as into the recess 38 and the channel 43. Thus, in the chamber 17 a partial vacuum prevails and the main valve is still closed. If the pressure be further increased, so that the piston 30 is moved so far to the right that the right hand edge of its thicker part 32 covers the apertures 42, the communication between said apertures and the part of the chamber 41 located to the right of the piston and thus also the communication with the suction chamber is shut off. Simultaneously a communication is opened at the left edge of the piston portion 32 between the part of the chamber 41 located to the left of said portion and the apertures 42 which thus are brought into communication with the pressure chamber 12 through the channels 25, 26, 27, 28. By such means the pressure fluid enters into the channel 43 and into the chamber 17 and opens the main valve 15. At the same time a communication is opened between the pressure chamber 12 and the chamber 35 through the channel 38 and the apertures 42 and 39, whereby the combined end surfaces of the piston 30 exposed to the pressure is considerably increased and the piston is moved to its extreme right hand position, thereby wholly opening all channels, which have previously been but partly opened. This position of the auxiliary valve is shown in Fig. 8.

When the valve 15 has opened the communication between the pressure chambers 12 and 13 of the pump devices A and B the fluid pressure will drop due to the fact that the load is now divided between the vanes of both pumps A and B, whereas before such opening, the required torque was produced solely by the fluid pressure acting on the vanes of pump A. The piston 30 would through the action of the spring 31 then be moved back to the initial position and immediately cause a readjustment of the main valve 15 were it not for the construction of the auxiliary valve shown. By suitably dimensioning the effective pressure areas of piston parts 32 and 33 the desired condition is obtained of preventing a readjustment of the main valve 15 until the pressure has obtained a value, which corresponds to a pressure with the transmission set at the former ratio which pressure will be lower than that pressure, at which the automatic opening of the valve 15 commenced or would again commence.

The above description of the mode of operation is evidently true, if the number of R. P. M. is below that value at which the weight 23 swings outwards and effects an adjustment of the valve sleeve 20. When the number of R. P. M. reaches such value, there is brought about in the hereinbefore described manner a communication between the chamber 41 to the left of the piston part 32, and the suction or idle fluid chamber 18, through the port 25 and channel 29 (Figs. 5 and 2). Thus, in this position of the auxiliary valve the pressure can never act on the piston 30 and consequently cannot enter into the chamber 17 and open the main valve 15. Should, however, the load of the driven shaft be increased beyond the driving force at disposal, the number of R. P. M. will of course be automatically decreased, and the sleeve 20 is then adjusted by the action of the spring 24, so that the chamber 17 as above described may be brought into communication with the pressure chamber 12 and the valve 15 be opened, whereby a different transmission ratio is obtained.

I do not claim certain features of the hydraulic transmission devices hereinbefore described, as such features are claimed in my co-pending United States applications: Serial No. 418,264, filed October 20, 1920; Serial No. 575,673, filed July 17, 1922; Serial No. 621,577, filed February 27, 1923; Serial No. 688,248, filed January 24, 1924; and in my United States Patents, No. 1,503,618, issued August 5, 1924; No. 1,510,368, issued September 30, 1924; No. 1,599,626, issued September 14, 1926.

The invention is not limited to the form of embodiment of the change speed gear shown in the drawings, it being obvious that the method of automatic hydraulic transmission ratio control hereinbefore set forth is adaptable to systems employing any type of pumping elements in any combination whereby a desired number of transmission ratios may be obtained. Furthermore, the automatic control itself is susceptible of various structural modifications without departing from the spirit of the invention, as set forth in the following claims.

What I claim as new and desire to secure by Letters Patent of the United States of America is:

1. A hydraulic coupling and change speed gear, comprising at least two co-operating pump elements, main valve means through the adjustment of which communication between pump elements is controlled and auxiliary control means sensitive to fluid pressure below a certain rotary speed, and sensitive only to centrifugal force above said rotary speed for adjusting said main valve means whereby the pumps are connected or disconnected to automatically provide appropriate transmission ratios under varying operating conditions.

2. A hydraulic coupling and change speed gear, comprising at least two co-operating rotary vane pumps, main valve means through the adjustment of which communication between said pumps is controlled, and auxiliary valve means adapted through hydraulic control to close and to maintain closed said main valve means in accordance with the speed of a rotating part of the transmission at speeds in excess of a predetermined number of R. P. M. and said auxiliary valve means being further adapted, through hydraulic control, to open or maintain open said main valve means if the fluid pressure within one of the said pumps exceeds a predetermined pressure, providing that the speed of said rotating part of the transmission is below said predetermined speed.

3. A hydraulic coupling and change speed gear, comprising a plurality of pumping stages, fluid sensitive main valve means through the adjustment of which communication between the said pumping stages is either opened or shut off, and auxiliary valve means adapted by its control of fluid acting on the said main valve means, to hold said latter means closed above a certain predetermined number of R. P. M. regardless of the pressure within the transmission and to hold said main valve means open below said number of R. P. M. if a predetermined fluid pressure be exceeded.

4. A hydraulic coupling and change speed gear, comprising a plurality of pumping stages, fluid sensitive main valve means and auxiliary valve means actuated by centrifugal force above a predetermined number of R. P. M. and adapted to control independently of the fluid pressure, the fluid acting on the said main valve means.

5. A hydraulic coupling and change speed gear, comprising a plurality of pumping stages, fluid sensitive main valve means and auxiliary valve means actuated by fluid pressure and adapted to control independently of the speed of rotation, fluid acting on the said main valve means at speeds below a predetermined number of R. P. M.

6. A hydraulic coupling and change speed gear, comprising a plurality of pumping stages, fluid sensitive main valve means and auxiliary valve means actuated by centrifugal force above a predetermined number of R. P. M. and by fluid pressure below said predetermined number of R. P. M. and adapted to control fluid acting on the said main valve means.

7. A hydraulic coupling and change speed gear according to claim 1, further characterized in that said auxiliary control means is adapted to, in a given transmission ratio, only permit readjustment to a preceding transmission ratio after the fluid pressure has obtained a value corresponding to a pressure in said preceding transmission ratio, which is lower than that perssure at which said first mentioned ratio was automatically established.

8. A hydraulic coupling and change speed gear, comprising at least two co-operating pump elements, main valve means having pressure sensitive surfaces through the adjustment of which communication between pump elements is controlled and auxiliary valve means comprising a ported sleeve rotatably mounted within a ported bore in one of the rotary parts of the change speed gear, said bore and sleeve being disposed substantially parallel to the rotational axis of said part, and said sleeve being provided with a port controlling, spring opposed, piston, co-operating with said ported sleeve and bore and acted on by the transmission fluid, a spring ballasted governing weight controlled by the rotational speed of a part of the transmission and adapted to rotate said ported sleeve within said bore, the parts being so disposed with respect to one another that under the influence of centrifugal force the registration of the ports in the sleeve and bore are varied, and under the influence of fluid pressure the relative positions of said port controlling piston and said ported sleeve are axially varied; and conduits connecting said auxiliary valve means with the pressure sensitive surfaces of said main valve means whereby through the action of said auxiliary valve means the position of said main valve means is automatically controlled.

In testimony whereof I affix my signature.

SVEN GUSTAF WINGQUIST.